United States Patent
Sambhwani et al.

(10) Patent No.: US 9,408,207 B2
(45) Date of Patent: Aug. 2, 2016

(54) METHODS AND APPARATUS FOR ENABLING FAST EARLY TERMINATION OF VOICE FRAMES ON THE UPLINK

(71) Applicant: QUALCOMM Incorporated, San Diego, CA (US)

(72) Inventors: Sharad Sambhwani, San Diego, CA (US); Jiye Liang, Beijing (CN); Yin Huang, Beijing (CN); Peyman Razaghi, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/405,143

(22) PCT Filed: Mar. 15, 2013

(86) PCT No.: PCT/CN2013/072742
§ 371 (c)(1),
(2) Date: Dec. 2, 2014

(87) PCT Pub. No.: WO2014/005440
PCT Pub. Date: Jan. 9, 2014

(65) Prior Publication Data
US 2015/0223237 A1  Aug. 6, 2015

Related U.S. Application Data

(63) Continuation-in-part of application No. PCT/CN2012/078023, filed on Jul. 2, 2012.

(51) Int. Cl.
*H04W 72/04* (2009.01)
*H04L 1/08* (2006.01)
(Continued)

(52) U.S. Cl.
CPC ............ *H04W 72/0446* (2013.01); *H04L 1/08* (2013.01); *H04L 1/1877* (2013.01);
(Continued)

(58) Field of Classification Search
CPC ...... H04L 1/1887; H04L 1/188; H04L 1/1877; H04L 1/1822; H04L 65/601; H04L 47/36; H04W 28/06; H04W 72/044; H04W 88/02; H04W 4/06; H04N 19/174; H04N 19/115; H04N 19/102; H04N 19/124; H04N 19/61; H04N 19/164; H04N 19/152
See application file for complete search history.

(56) References Cited

U.S. PATENT DOCUMENTS 6,868,075 B1 *  3/2005  Narvinger ............. H04L 1/0068
                                                    370/320
8,005,463 B2  8/2011  Cermak et al.
(Continued)

FOREIGN PATENT DOCUMENTS

CN  101352089 A  1/2009
WO  2007128182 A1  11/2007
(Continued)

OTHER PUBLICATIONS

International Search Report and Written Opinion—PCT/CN2013/072742—ISA/EPO—May 9, 2013.
(Continued)

Primary Examiner — Jung-Jen Liu
(74) Attorney, Agent, or Firm — François A. Pelaez

(57) ABSTRACT

Methods and apparatus of wireless communication at a user equipment comprise compressing an uplink data packet. The methods and apparatus further comprise transmitting the uplink data packet on an uplink dedicated transport channel (DCH) to a network entity a plurality of times within a time duration allowed for transmission of the uncompressed uplink data packet. Moreover, the methods and apparatus comprise receiving a downlink acknowledgement message from the network entity corresponding to the uplink data packet. Additionally, the methods and apparatus comprise terminating transmission of the uplink DCH by transmitting bits of zero power for a remainder of the time duration on the DCH based on receiving the downlink acknowledgement message.

38 Claims, 15 Drawing Sheets

(51) Int. Cl.
   *H04L 1/18*    (2006.01)
   *H04L 5/00*    (2006.01)
   *H04W 28/06*   (2009.01)
   *H04W 52/14*   (2009.01)
   *H04W 52/20*   (2009.01)
   *H04W 52/24*   (2009.01)

(52) U.S. Cl.
   CPC .......... *H04L 5/0055* (2013.01); *H04W 28/065* (2013.01); *H04W 52/146* (2013.01); *H04W 52/20* (2013.01); *H04W 52/241* (2013.01); *H04W 72/0413* (2013.01)

(56) References Cited

U.S. PATENT DOCUMENTS

| | | | | |
|---|---|---|---|---|
| 8,995,417 B2* | 3/2015 | Jou | ........................ | H04L 1/0025 370/342 |
| 2002/0093937 A1* | 7/2002 | Kim | ........................ | H04L 1/0066 370/349 |
| 2005/0099968 A1* | 5/2005 | Yamano | ................ | H04W 52/58 370/311 |
| 2007/0025264 A1* | 2/2007 | Cheng | .................... | H04L 47/14 370/252 |
| 2008/0101440 A1* | 5/2008 | Lee | ........................ | H04J 13/00 375/141 |
| 2008/0215948 A1* | 9/2008 | Pinheiro | ............... | H04L 1/1887 714/748 |
| 2009/0164862 A1* | 6/2009 | Sagfors | ................ | H04L 1/1803 714/748 |
| 2009/0232052 A1* | 9/2009 | Black | .................... | H04L 1/0025 370/328 |
| 2009/0303968 A1* | 12/2009 | Jou | ....................... | H04L 1/0025 370/336 |
| 2009/0303976 A1* | 12/2009 | Jou | ....................... | H04L 1/0025 370/342 |
| 2011/0103367 A1 | 5/2011 | Ishii | | |
| 2012/0044812 A1 | 2/2012 | Hiddink et al. | | |
| 2012/0113942 A1 | 5/2012 | Kim | | |
| 2012/0176947 A1 | 7/2012 | Xi et al. | | |
| 2012/0201205 A1* | 8/2012 | Gopalakrishnan | .... | H04L 1/1816 370/329 |
| 2013/0067293 A1* | 3/2013 | Somasundaram | .... | H04L 1/1887 714/749 |

FOREIGN PATENT DOCUMENTS

| | | |
|---|---|---|
| WO | 2008085954 A2 | 7/2008 |
| WO | 2008155353 A1 | 12/2008 |
| WO | 2009152138 A2 | 12/2009 |

OTHER PUBLICATIONS

International Search Report and Written Opinion—PCT/CN2012/078023—ISA/EPO—Apr. 11, 2013.

* cited by examiner

METHODS AND APPARATUS FOR ENABLING FAST EARLY TERMINATION OF VOICE FRAMES ON THE UPLINK

CLAIM OF PRIORITY UNDER 35 U.S.C. §119

The present Application for Patent is a National Stage of PCT Application No. PCT/CN2013/072742 entitled "METHODS AND APPARATUSES FOR ENABLING FAST EARLY TERMINATION OF VOICE FRAMES ON THE UPLINK" filed Mar. 15, 2013, and claims priority to PCT International Application No. PCT/CN2012/078023 entitled "METHODS AND APPARATUS FOR ENABLING FAST EARLY TERMINATION OF VOICE FRAMES ON THE UPLINK" filed Jul. 2, 2012, both of which are assigned to the assignee hereof and hereby expressly incorporated by reference herein.

BACKGROUND

1. Field

Aspects of the present disclosure relate generally to wireless communication systems, and more particularly, to wireless device transmission timing.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication systems, circuit-switched voice inefficiency remains an issue which may negatively affect overall wireless network communications. In particular, the foregoing voice inefficiency may result in high power consumption at user equipments (UE). Further, current implementations of UEs and base stations fail to address the aforementioned voice inefficiency. Thus, enhancements in wireless network communications are desired.

SUMMARY

In one aspect, a method of wireless communication at a user equipment comprises compressing an uplink data packet. The method further comprises transmitting the uplink data packet on an uplink dedicated transport channel (DCH) to a network entity a plurality of times within a time duration allowed for transmission of the uncompressed uplink data packet. Moreover, the method comprises receiving a downlink acknowledgement message from the network entity corresponding to the uplink data packet. Additionally, the method comprises terminating transmission of the uplink DCH by transmitting bits of zero power for a remainder of the time duration on the DCH based on receiving the downlink acknowledgement message.

Another aspect of the present disclosure includes an apparatus for wireless communication comprising means for compressing an uplink data packet. The apparatus further comprises means for transmitting the uplink data packet on an uplink dedicated transport channel (DCH) to a network entity a plurality of times within a time duration allowed for transmission of the uncompressed uplink data packet. Moreover, the apparatus comprises means for receiving a downlink acknowledgement message from the network entity corresponding to the uplink data packet. Additionally, the apparatus comprises and means for terminating transmission of the uplink DCH by transmitting bits of zero power for a remainder of the time duration on the DCH based on receiving the downlink acknowledgement message.

In another aspect, a computer program product comprising a computer-readable medium comprises code for compressing an uplink data packet and transmitting the uplink data packet on an uplink dedicated transport channel (DCH) to a network entity a plurality of times within a time duration allowed for transmission of the uncompressed uplink data packet. The computer-readable medium further comprises code for receiving a downlink acknowledgement message from the network entity corresponding to the uplink data packet. Moreover, the computer-readable medium comprises code for terminating transmission of the uplink DCH by transmitting bits of zero power for a remainder of the time duration on the DCH based on receiving the downlink acknowledgement message.

Additional aspects include an apparatus for wireless communication comprising at least one processor and a memory coupled to the at least one processor. The at least one processor is configured to compress an uplink data packet and transmit the uplink data packet on an uplink dedicated transport channel (DCH) to a network entity a plurality of times within a time duration allowed for transmission of the uncompressed uplink data packet. The at least one processor is further configured to receive a downlink acknowledgement message from the network entity corresponding to the uplink data packet. Moreover, the at least one processor is configured to terminate transmission of the uplink DCH by transmitting bits of zero power for a remainder of the time duration on the DCH based on receiving the downlink acknowledgement message.

In a further aspect, a method of wireless communication at a network entity comprises receiving at least a portion of an uplink data packet from a user equipment (UE) on an uplink dedicated transport channel (DCH), wherein the uplink data packet is compressed. Moreover, the method comprises attempting to early decode the uplink data packet at a set of early decode times. The method further comprises updating a signal-to-interference ratio (SIR) target value associated with the UE where the uplink data packet is successfully decoded at a particular decoding attempt. Additionally, the method comprises transmitting an uplink power control message to the UE, wherein the contents of uplink power control message is based at least on the SIR target value and the SIR target value is associated with a target residual block error rate (BLER).

Additional aspects include an apparatus for wireless communication comprising means for receiving at least a portion of an uplink data packet from a user equipment (UE) on an uplink dedicated transport channel (DCH), wherein the uplink data packet is compressed. Moreover, the apparatus comprises means for attempting to early decode the uplink data packet at a set of early decode times. The apparatus comprises means for comprises updating a signal-to-interference ratio (SIR) target value associated with the UE where the uplink data packet is successfully decoded at a particular decoding attempt. Additionally, the apparatus comprises means for transmitting an uplink power control message to the UE, wherein the contents of uplink power control message is based at least on the SIR target value and the SIR target value is associated with a target residual block error rate (BLER).

Another aspect of the present disclosure includes a computer program product comprising a computer-readable medium comprising code for receiving at least a portion of an uplink data packet from a user equipment (UE) on an uplink dedicated transport channel (DCH), wherein the uplink data packet is compressed. Moreover, the computer-readable medium comprises code for attempting to early decode the uplink data packet at a set of early decode times. The computer-readable medium comprises code for updating a signal-to-interference ratio (SIR) target value associated with the UE where the uplink data packet is successfully decoded at a particular decoding attempt. Additionally, computer-readable medium comprises code for transmitting an uplink power control message to the UE, wherein the contents of uplink power control message is based at least on the SIR target value and the SIR target value is associated with a target residual block error rate (BLER).

An additional aspect includes an apparatus for wireless communication comprising at least one processor and a memory coupled to the at least one processor. The at least one processor is configured to receive at least a portion of an uplink data packet from a user equipment (UE) on an uplink dedicated transport channel (DCH), wherein the uplink data packet is compressed. Moreover, the at least one processor is configured to attempt to early decode the uplink data packet at a set of early decode times. The at least one processor is further configured to update a signal-to-interference ratio (SIR) target value associated with the UE where the uplink data packet is successfully decoded at a particular decoding attempt. Additionally, the at least one processor is configured to transmit an uplink power control message to the UE, wherein the contents of uplink power control message is based at least on the SIR target value and the SIR target value is associated with a target residual block error rate (BLER).

These and other aspects of the present disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to aspects of the present disclosure, methods and apparatuses are provided for early power down of a UE transmitter in a voice frame while providing reliable link efficiency. Such methods and apparatuses can enhance UE transmitter or modem current savings during a voice call (e.g. a circuit-switched (CS) call on a dedicated channel (DCH) in WCDMA). Furthermore, these methods and apparatuses can bring about network-side benefits. For example, inter-cell or other signal interference may be minimized because overall UE signaling in a network can be reduced with the shortened UE transmitter operation time of the present disclosure. In a related network advantage, network load and user experience may be optimized because the present reduction in UE transmission can allow more UEs to transmit signals simultaneously.

Figure 1:
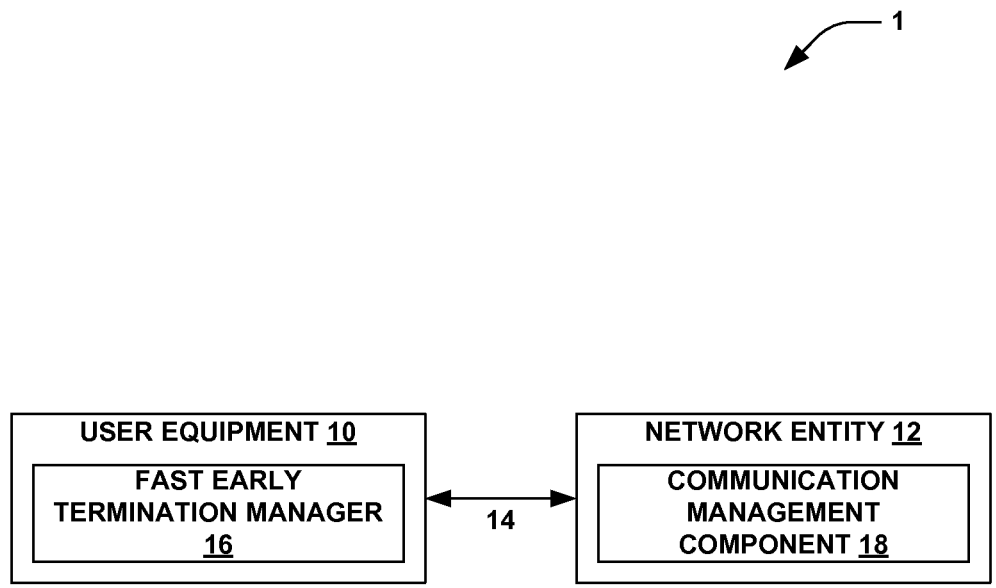
FIG. 1 is a block diagram of an example wireless system according to the present disclosure.

Referring to FIG. 1, in an aspect, an example wireless communications system 1, which includes at least a UE 10 and a network entity 12, may be configured to communicate over an air-interface communication link 14 and facilitate fast early termination (FET) of one or more components in UE 10. Network entity 12 may include or additionally be referred to as a picocell, a relay, a Node B, a mobile Node B, a UE (e.g., communicating in peer-to-peer or ad-hoc mode with UE 10), or substantially any type of component that can communicate with UE 10 to provide wireless network access (e.g., to a network) at a UE (e.g., UE 10). In an aspect, UE 10 may include a FET manager 16, which may be configured to power down one or more of its components, such as, but not limited to, a transmitter. Furthermore, network entity 12 may include a communication management component 18, which may be configured to establish and/or update a target transmission power level associated with the UE.

Figure 2:
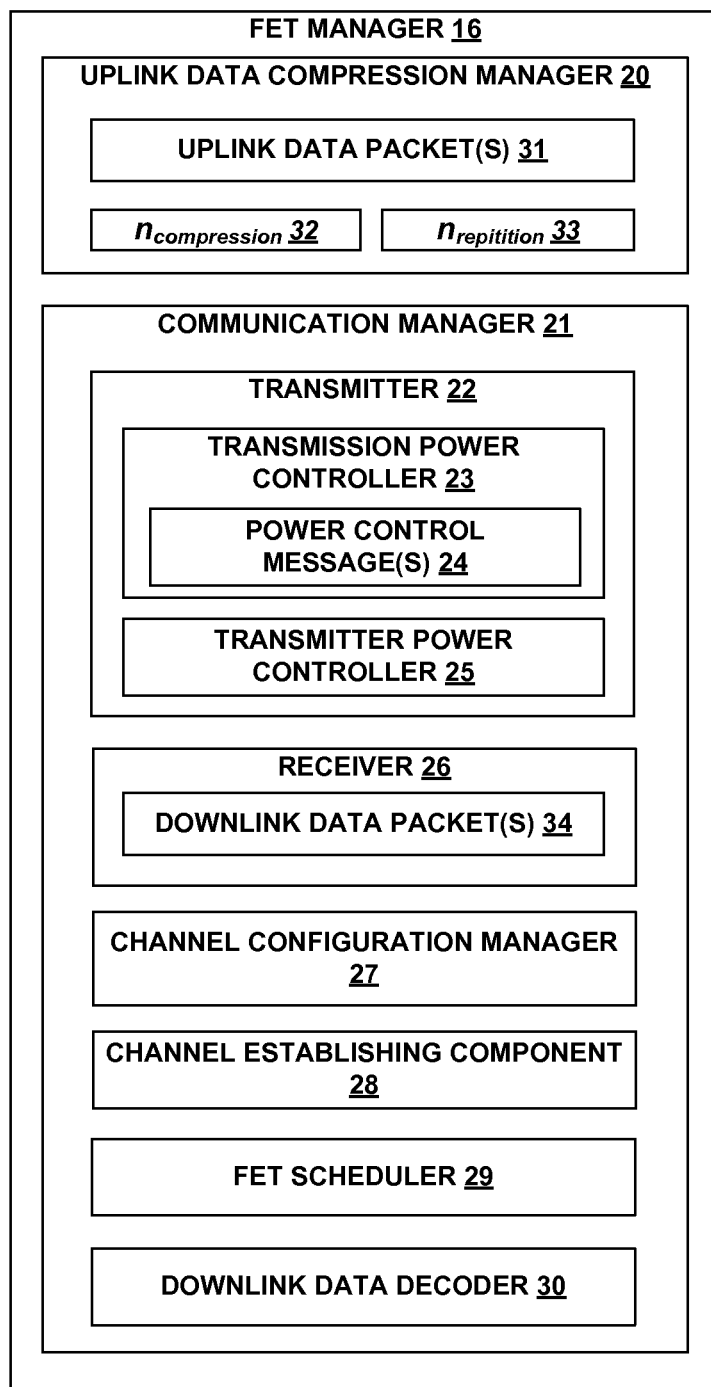
FIG. 2 is a block diagram of an example Fast Early Termination (FET) manager according to aspects of the present disclosure.

Referring to FIG. 2, in an aspect, an example block diagram containing example components and/or subcomponents of an FET manager 16 (FIG. 1), which may be configured to communicate with a network and quickly power down a transmitter 22 when such communication has been successfully completed, for example, before a frame elapses. In an aspect, FET manager 16 may include an uplink data compression manager 20, which may be configured to compress one or more uplink data packets 31 for transmission to a network entity. In an aspect, FET manager 16 may be configured to compress the uplink data packet 31 contents by a factor of n (e.g., $n_{compression}$ 32) and copy or repeat the compressed packet n times (e.g., $n_{repetition}$ 33).

In an aspect, such compression may be achieved by uplink data compression manager 20 by reducing the packet Transmission Time Interval (TTI). For example, Dedicated Transport Channel (DTCH) and Dedicated Control Channel (DCCH) packets may be repeated twice in the uplink-in other words, n equals two. For example, at the Media Access Control (MAC) layer, the packets received every 20 ms (for DTCH) and 40 ms (for DCCH) may be repeated twice. The duplicate packets are passed to the Physical Layer (PHY), configured with a Transmission Time Interval (TTI) value half of the original. For example, DTCH packets configured with a 10 ms TTI and DCCH packets are configured with 20 ms TTI. All PHY-specific parameters like rate matching, $1^{st}$ and $2^{nd}$ layer interleaver parameters, and so on, are derived from the configured 10 ms and 20 ms TTI values, according to the legacy specifications in the Third Generation Partnership Project (3GPP) Specification TS 25.212, which is hereby incorporated by reference.

In further aspects, the number of repetitions n in the above scheme can also be two or more, achieved through modifications to rate matching algorithm. In the above example case, the PHY layer may configure transport channels with 10 ms or 20 ms TTI parameters. However, the rate matching algorithm may be modified to apply a lower spreading factor, and send the uplink data packet 31 over a shorter duration. For example, if a spreading factor of 64 is computed according to legacy 3GPP TS 25.212 specification for the packet, the new rate matching algorithm would use a spreading factor of 16 to achieve a compression factor of 4, and sends the packet 4 times (n=4). This allows four repetitions, while the packet still spans the same duration. Furthermore, in an aspect, communication manager 21 may include an FET scheduler 29, which may be configured to synchronize communication via compressed and/or repeated packet forms between the UE (e.g., UE 10, FIG. 1) and one or more network entities (e.g., network entity 12, FIG. 1).

In addition, FET manager 16 may include a communication manager 21, which may be configured to communicate with one or more network entities, for example, as to allow FET of a UE transmitter 22. In an aspect, transmitter 22 may include a transmission power controller 23, which may be configured to receive one or more uplink power control messages 24 (e.g. Transmit Power Commands (TPC)) from a network entity, which may each receive and/or process one or more power adjust bits instructing the transmission power controller 23 to adjust the transmission power of transmitter 22 up or down. Using these uplink power control messages 24, transmission power controller 23 may adjust the transmission power of transmitter 22 intermittently (for example, at an FET packet decode frequency or a TPC receipt frequency) to target the SIR target.

Furthermore, transmitter 22 may include a transmitter power controller 25, which may be configured to power up and/or power down transmitter 22. According to aspects herein, such power down may occur early relative to traditional packet transfer in a frame and is therefore termed Fast Early Termination (FET) for purposes of this disclosure. In an aspect, such power down may occur when a UE (e.g., UE 10, FIG. 1) receives an acknowledgement message (ACK) corresponding to an upload data packet (e.g. Cyclic Redundancy Check (CRC) passes at the network entity) and/or successfully receives and decodes, for example, at a downlink data decoder 30, a downlink packet from the network entity (CRC passes). Additionally, communication manager 21 may include a receiver 26, which may be configured to receive one or more downlink data packets 34 from a network entity (e.g., network entity 12, FIG. 1).

In addition, communication manager 21 may include a channel configuration manager 27, which may be configured to configure, such as provide a Slot Format for one or more channels (e.g. control channels and/or data transport channels). In the WCDMA+ uplink design, Transport Format Combination Indicator (TFCI) information is carried, along with ACK messages for received downlink data packets (e.g. FET packets), over a new channel—namely, in one example, FET-DPCCH, which is described below. Thus, there is no need for TFCI information to be included in the DPCCH channel. To this end, the uplink of the DPCCH channel is configured with Slot Format 1, as defined in 3GPP TS 25.211, Section 5.2.2.1, Table 2:

TABLE 2

| | | | | | | | | | | |
|---|---|---|---|---|---|---|---|---|---|---|
| | | | 3GPP TS 25.211 | | | | | | | |
| Slot Format | Channel Bit Rate (kbps) | Channel Symbol Rate (ksps) | SF | Bits/ Frame | Bits/ Slot | $N_{pilot}$ | $N_{TPC}$ | $N_{TFCI}$ | $N_{FBI}$ | Transmitted slots per radio frame |
| 1 | 15 | 15 | 256 | 150 | 10 | 8 | 2 | 0 | 0 | 15 |

Note that Slot Format 1 in some previous specifications could not be configured for the DPCCH channel if DPDCH was being transmitted, and the present enhancements remove this constraint.

In an additional aspect, communication manager 21 may include a channel establishing component 28, which may be configured to initiate, establish, and/or otherwise configure one or more communication channels for communication with one or more network entities. In one aspect of the present disclosure, channel establishing component 28 may establish an FET-DPCCH channel, which may relay TFCI information and ACK messages corresponding to correctly-received downlink data packets 34. In an aspect, transmission of the TFCI may begin at the start of a new data packet transmission to help the receiving entity (e.g. network entity) quickly identify the type of data packets transmitted by the transmitting entity (e.g. user equipment) and received at the receiving entity. Such operation allows for early decoding of the data packets. Furthermore, the TFCI may be repeated and/or transmitted multiple times to assist the receiving entity decode the data packets. In an aspect, a UE may transmit an ACK message to a network entity, such as a NodeB, to terminate downlink transmission as soon as the downlink data packet 34 is decoded. The ACK message is carried along with TFCI over the new FET-DPCCH channel.

Moreover, communication manager 21 may implement any one or more components and/or subcomponents described herein to terminate uplink data communication and hence enable FET. For example, the transmitter 22 may be configured to transmit the uplink data packet (e.g., uplink data packet 31) on a transport channel (e.g., DCH) to a network entity (e.g., network entity 12) a plurality of times within a time duration allowed for transmission of the uncompressed packet (e.g., a data frame). Further, receiver 26 may be configured to receive a downlink acknowledgement message from the network entity (e.g., network entity 12) corresponding to the uplink data packet (e.g., uplink data packet 31). Upon reception of the ACK message, communication manager 21 may be configured to terminate transmission of an uplink communication channel (e.g., DCH) by setting the transmit power to zero for the remainder of the time duration (e.g., remaining duration of the data frame) on the communication channel.

It should be understood that the present disclosure provides notable distinctions from hybrid automatic repeat request (HARQ). For example, in HARQ, transmission may be terminated immediately upon receiving an ACK message and transmission of a new packet. However, the present disclosure terminates transmission of an uplink communication channel (e.g., DCH) by transmitting zero bit indications (e.g., bits transmitted with zero power) for the remainder of the time duration on the communication channel. Further, the next time duration allowed for transmission of an uncompressed packet (e.g., next frame) does not begin until the following TTI boundary. As such, the remaining portions and/or duration of the current time duration allowed for transmission of an uncompressed packet (e.g., current frame) may include bits of zero power once an ACK message has been received and/or the packet has been decoded. A further distinction may be, for instance, that the present disclosure provides for back-to-back (e.g., continuous) transmission repetition of the uplink data packets, whereas in HARQ, repetition may permit intermediate gaps to allow reception of an ACK (e.g., because decoding is only attempted at the end of each HARQ transmission, and not while the transmission is ongoing).

Furthermore, one or more components of FET manager 16, such as, but not limited to communication manager 21, transmitter 22, channel establishing component 28, or channel configuration manager 27, may multiplex the FET-DPCCH channel using a separate channelization code, such as by I/Q multiplexing the FET-DPCCH channel with another channel on a free I/Q branch—for example, with a High Speed Dedicated Physical Channel (HS-DPCCH). For example, the foregoing multiplexing is provided in more detail with respect to FIG. 3.

Figure 3:
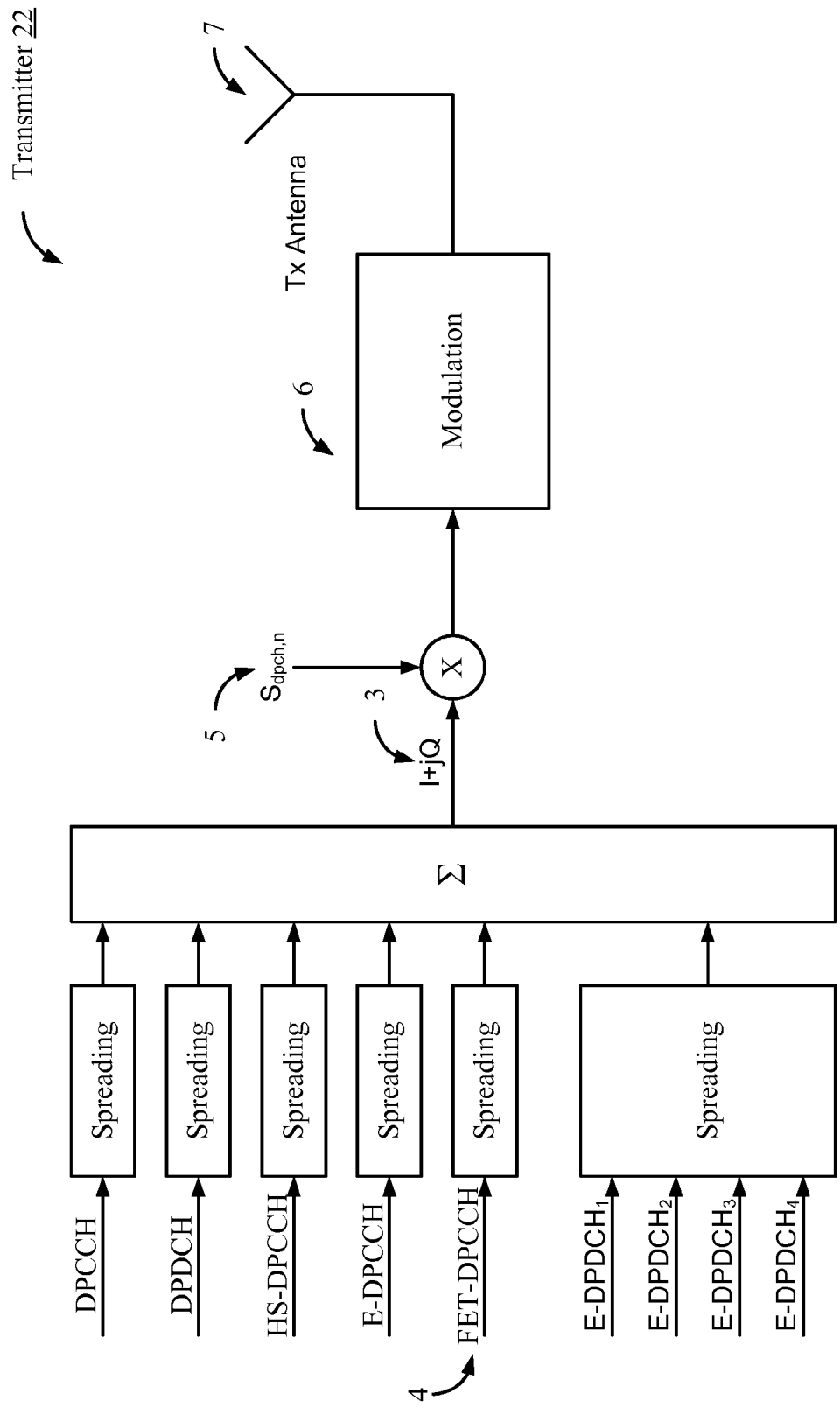
FIG. 3 is a schematic diagram of an example FET transmission arrangement according to aspects of the present disclosure.

Referring to FIG. 3, an aspect of transmitter 22 (FIG. 2) introducing FET-DPCCH to carry the uplink TFCI and downlink FET ACK is disclosed. For example, the FET transmitter 22 may be configured to multiplex the FET-DPCCH channel 4 using a separate channel code 3, such as by I/Q multiplexing the FET-DPCCH 4 channel with another channel on a free I/Q branch, such as, but not limited to a HS-DPCCH 5. Further, the FET transmitter 22 may include modulator 6 and transmission antenna 7, which may be configured to modulate the multiplexed information including the TFCI and ACK, and transmit at least the TFCI and ACK to a network entity (e.g., network entity 12, FIG. 1). In some aspects, the schematic arrangement of transmitter 22 in FIG. 3 may be optionally or alternatively included or made part of any one or more components and/or subcomponents of fast early termination manager 16 (FIGS. 1 and 2).

Figure 4:
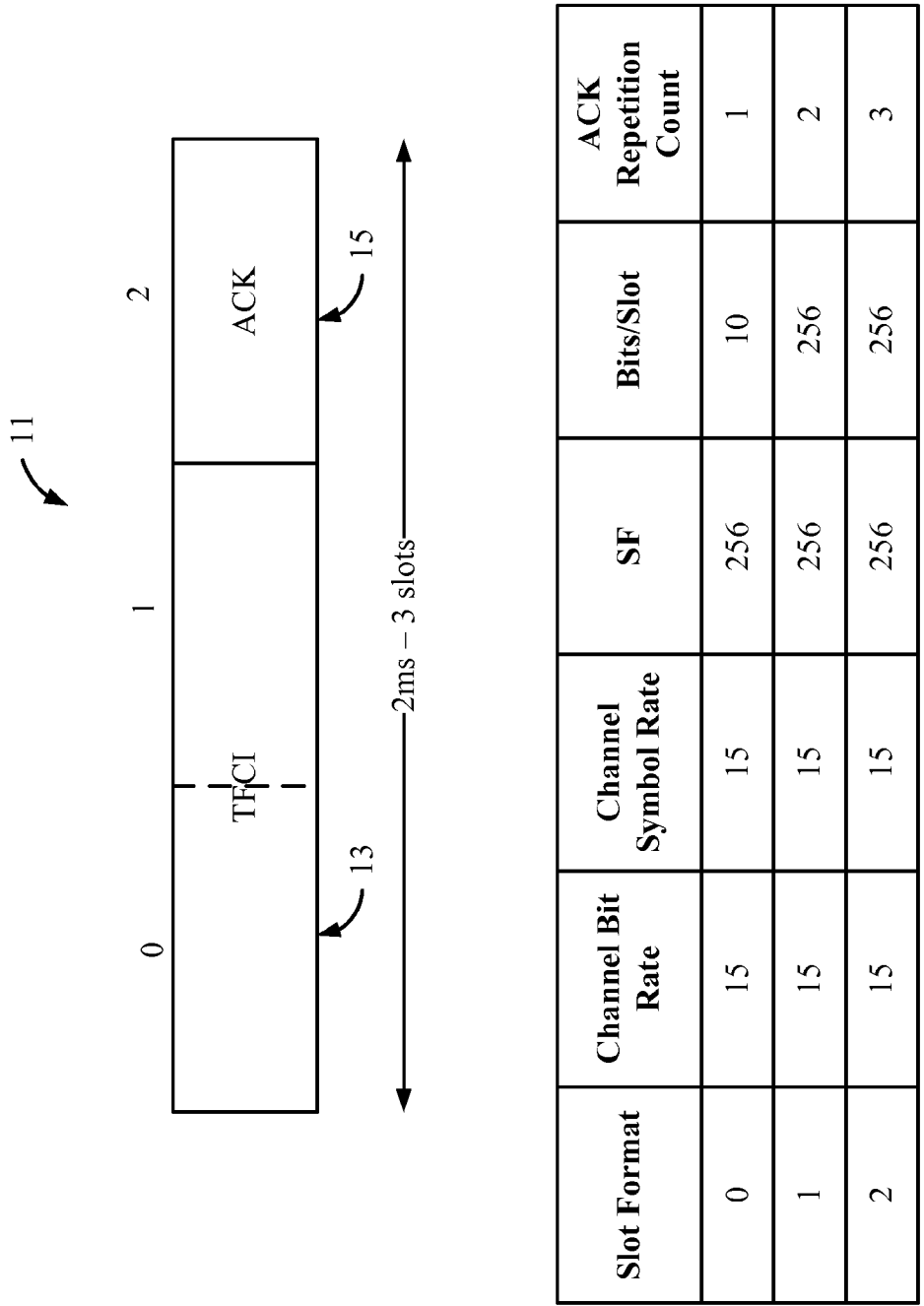
FIG. 4 illustrates an example FET Dedicated Physical Control Channel (FET_DPCCH) slot format(s) for ACK according to aspects of the present disclosure.

In an additional aspect, channel establishing component 28 and/or channel configuration manager 27 may configure establish, and/or otherwise determine a Slot Format for FET-DPCCH. For example, depending on the payload and configuration, slot formats 0, 1, or 2 allow for 1, 2, or 3 slots to be transmitted. The FET-DPCCH may be relatively similar to the HS-DPCCH channel (3GPP TS 25.211, Section 5.2.1.2), but may exhibit a few notable differences. For example, referring to FIG. 4, the present disclosure provides a Slot Format for FET-DPCCH 13. In the FET-DPCCH channel, TFCI information 13 replaces a Channel Quality Indicator (CQI), and ACK message for downlink circuit-switched (CS) traffic 15 replaces ACK message for high-speed traffic. Another important difference is that in the FET-DPCCH channel, the two slots carrying the TFCI may precede the slot carrying ACK.

Furthermore, in an aspect, the TFCI information 13 may be encoded using the encoding scheme used for CQI messages in HS-DPCCH. Thus, TFCI information 13 may be encoded using a (20,5) Reed Muller code as defined in 3GPP TS 25.212, version 11.1.0, Section 4.9.4. Furthermore, TFCI information 13 may be modulated using Slot Format 1, and may be encoded based on a Reed Muller (20,5) punctured code, which is the encoding scheme used to encode CQI information in an HS-DPCCH channel. For Enhanced Voice Service (EVS) voice traffic, there may be a maximum of 10 TFC combinations, requiring 4 bits to signal. The encoding scheme in HS-DPCCH channel for CQI allows for 10 bits of information, encoded using 20 bits. Under this configuration, packet-switched (PS) data radio bearers are assumed to have been moved to an Enhanced Dedicated Channel (E-DCH)—thus, a (20,5) format is enough to encode TFCI. Furthermore, in example cases wherein there is a need to support 10 bits of TFCI information, as in some legacy systems, TFCI slots are configured with (20,10) encoding format—i.e., 10 bits of information encoded using 20 bits, as defined in Rel-8 to jointly encode CQI information for two carriers in DC-HS-DPA systems. TFCI to CQI mapping is illustrated below:

| TFCI | CQI |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |

| TFCI | CQI |
|---|---|
| 9 | 9 |
| 10 | 10 |

In addition, any generated and/or transmitted not-acknowledged (NACK) messages according to the present disclosure may be encoded by transmitting discontinuous transmission (DTX) symbols during the NACK slots (see below). Moreover, ACK messages described herein may be encoded by transmitting an all-1 sequence as defined below:

| Message | Bit Pattern |
|---|---|
| ACK | (1, 1, 1, 1, 1, 1, 1, 1, 1, 1) |
| NACK (NCK) | (Ұ,Ұ,Ұ,Ұ,Ұ,Ұ,Ұ,Ұ,Ұ,Ұ,Ұ) Ұ stands for DTX |

Furthermore, note that the ACK message can be configured to repeat as discussed in relation to FIG. 1. In operation, this configuration may be signaled or controlled by an ACK-nREPEAT configuration parameter signaled from upper layers.

Figure 5:
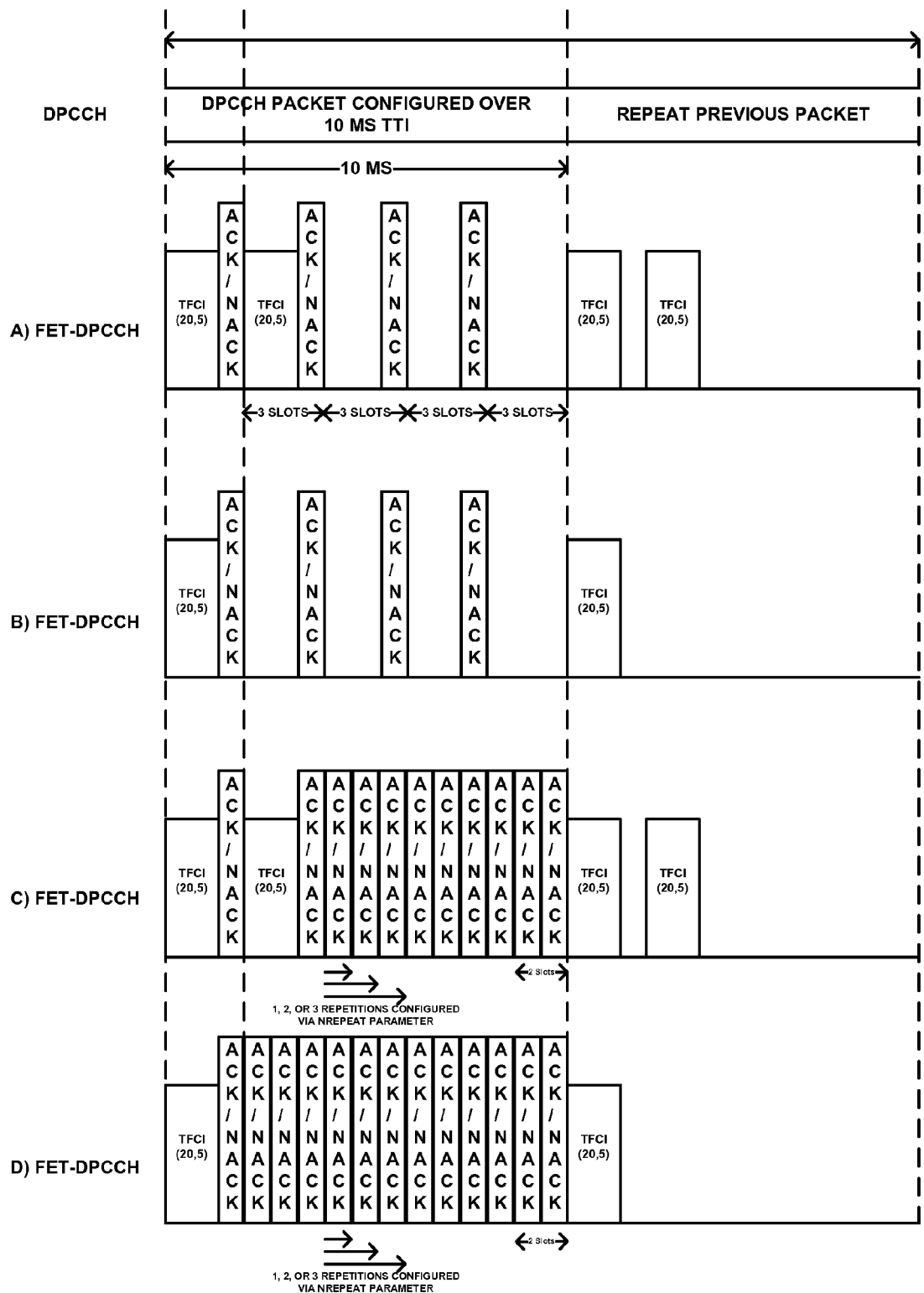
FIG. 5 is a timing diagram of several example data type combinations associated with a FET-DPCCH of the present disclosure.

Turning to FIG. 5, illustrated are various configurations for the FET-DPCCH channel, which may depend on the number and places TFCI and ACK messages are repeated. In an aspect, the TFCI may be modulated using Slot Format 1 described above, which is equivalent to having two consecutive slots carrying 20 bits reserved to encode the TFCI information. The location of the two TFCI slots may depend on the configuration selected for the FET-DPCCH channel, which can be signaled from upper layers. On the other hand, the ACK message may be encoded using Slot Format 0, and can be configured to repeat, occupying one, two, or three slots, which again may depend on the configuration signaled from upper layers. Under different configurations for the FET-DPCCH channel, some slots may be reserved for TFCI message and some for ACK.

In an example and non-limiting Configuration A of FIG. 5, the TFCI information is sent in slots 0 and 1 during the first 10 ms radio frame, and repeated during slots 3, and 4, and again during slots 15 and 16, and again during slots 18 and 19. The ACK/NACK message is sent in slots 2, 5, 8, and 11—i.e., every third slot after the TFCI message except the last slot. Recall that the NACK message may consist of exclusively DTX symbols—in other words, only a single ACK message may be transmitted (if early decoding succeeds) in the first 10 ms.

In an example and non-limiting Configuration B, the TFCI information is sent in slots 0, 1, and then repeated at the beginning of the second 10 ms radio frame, in slots 15 and 16 (0 and 1 of the second radio frame). The slots reserved for ACK/NACK messages are similar to those of Configuration A.

In an example and non-limiting Configuration C, the TFCI is sent like Configuration A, in slots 0, 1, and repeated in slots 3 and 4. However, in this configuration, the (first) ACK message can be transmitted in any one of slots 2, 5, 6, 7, 8, 9, 10, 11, or 12. The ACK message in this configuration may be configured to be transmitted once (no repetitions), two times, or three times, as signaled through ACK-nREPEAT message from upper layers. If ACK repetition is configured, the first ACK message may be transmitted at the earliest opportunity (among slots 2, 5, 6, 7, 8, 9, 10, 11, or 12) upon successful early decoding at the UE, followed by as many repetitions configured. For example, if the first ACK message is sent during slot 12, and three ACK repetitions are configured, then the ACK message is sent in slots 12, 13, 14 (three times).

Example and non-limiting Configuration D is similar to C, but the TFCI message occupies slots 0, 1, and in the second radio frame, 15 and 16, which is similar to the TFCI formation in Configuration B. Like Configuration C, the ACK message can be configured to be repeated as many times as ACK-nREPEAT signaling indicates or requests.

In an aspect, the configurations of FIG. 5 may be stored in and/or executed by FET manager 16 (FIGS. 1 and 2). Furthermore, though FET manager 16 has been thus far referenced in relation to UE 10 of FIG. 1, if should be understood that network entity 12 may likewise contain a portion or all of the components of FET manager 16. In such iterations, however, uplink data compression manager 20 may be a downlink data compression manager and downlink data decoder 29 may comprise an uplink data decoder.

Figure 6:
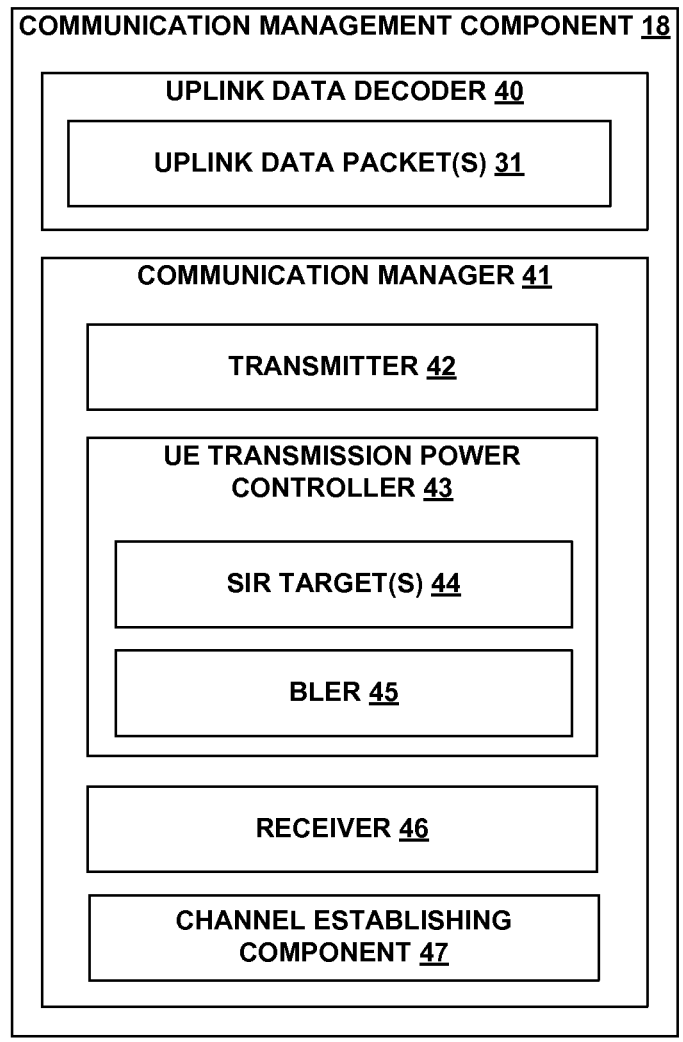
FIG. 6 is a block diagram of an example communication management component according to aspects of the present disclosure.

Turning to FIG. 6, illustrated is an example communication management component 18 of a network entity (e.g., network entity 12, FIG. 1) contemplated by the present disclosure. In an aspect, communication component 18 may be configured to communicate with one or more UEs in a wireless system (e.g. a WCDMA system), such as UEs configured for fast early termination and the communication specifications or formats utilized by such FET-enabled UEs (e.g., UE 10, FIG. 1). In an aspect, communication management component 18 may include an uplink data decoder 40, which may be configured to decode uplink data packet(s) 31 received from a UE and may check whether such data was correctly received.

In an additional aspect, communication management component 18 may include its own communication manager 41, which may be configured to control downlink communications, receive uplink communications, establish channels with one or more UEs, and manage transmission power control associated with the UEs. For example, communication manager 41 may include a transmitter 42 and/or a receiver 46, which may comprise a transceiver in some examples, configured to transmit and receive (respectively) data packets and other communications or signals. Furthermore, communication manager 41 may include a channel establishing component 47, which may be configured to establish one or more communication channels with one or more UEs, such as, but not limited to, control channels and/or data transmission channels, including the previously-described FET-DPCCH channel.

Moreover, communication manager 41 may include a UE transmission power controller 43, which may be configured to calculate, generate, and/or transmit one or more SIR targets 44 to one or more UEs. In an aspect, each SIR target 44 may be based at least partially on a target and/or target residual Block Error Rate (BLER) 45 associated with a communication.

Figure 7:
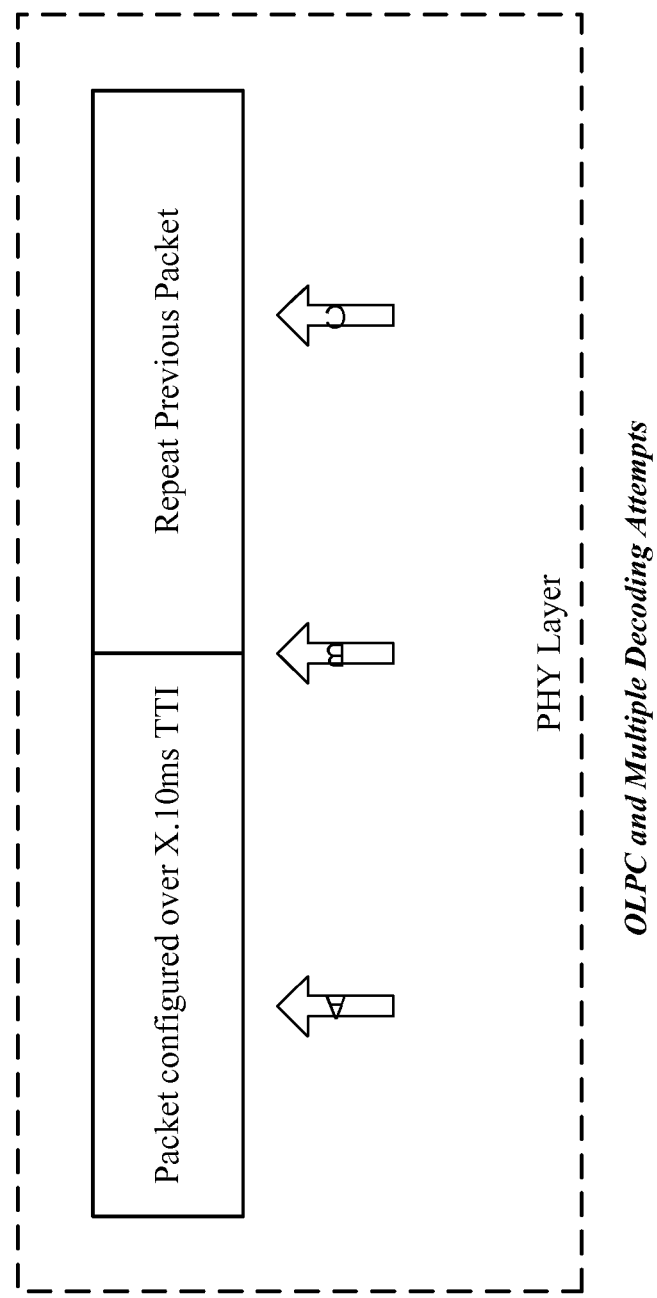
FIG. 7 illustrates an example outer loop control (OLPC) decoding attempt according to aspects of the present disclosure.

In an aspect, UE transmission power controller 43 may update the SIR target 44 at the network entity whenever a successful decoding attempt occurs for any transport channel (a CRC pass), or if decoding fails (no CRC pass) in all decoding attempts up to, and including, the final decoding attempt for the first packet of a duplicate pair of packets. An example structure and timing of such multiple decoding attempts, marked as A, B, and C, is illustrated in FIG. 7, which provides an aspect of multiple decoding attempts of one or more packets. For example, decoding attempts may occur at any one or more times indicated as A, B and/or C.

Furthermore, UE transmission power controller 43 may comprise an outer loop power controller (OLPC) implementing an OLPC algorithm. The OLPC algorithm may control when OLPC is updated under different scenarios, and may be defined in the non-limiting example operational table below:

| Decoding Attempt A | Decoding Attempt B | Decoding Attempt C | OLPC SIR Update |
|---|---|---|---|
| CRC Pass | Not tried | Not tried | Update as CRC Pass - immediately after A |
| CRC Fail | CRC Pass | Not tried | Update as CRC Pass - immediately after B |
| CRC Fail | CRC Fail | CRC Pass | Update as CRC Fail - immediately after B |
| CRC Fail | CRC Fail | CRC Fail | Update as CRC Fail - immediately after B |

OLPC Operation Targeting End of the First Packet

The above OLPC algorithm may be applied to any transport channel (e.g., DTCH or DCCH) for which early termination is configured. If FET is not configured for a transport channel, the OLPC algorithm may react, as in current systems, to the outcome of the only decoding attempt for that channel. In addition, the above example illustrates the situation where the BLER target is enforced at the end of the first packet. However, the BLER target could also be enforced at some other configured time instant. For example, with early decoding enabled, the OLPC could be configured to enforce a certain BLER target at any of early-decoding attempts, whether the decoding attempt occurs during the first or the second packet. Further, both the BLER target itself as well as the time instant at which it is targeted can be varied depending on conditions such as network load or UE power headroom.

Figure 8:
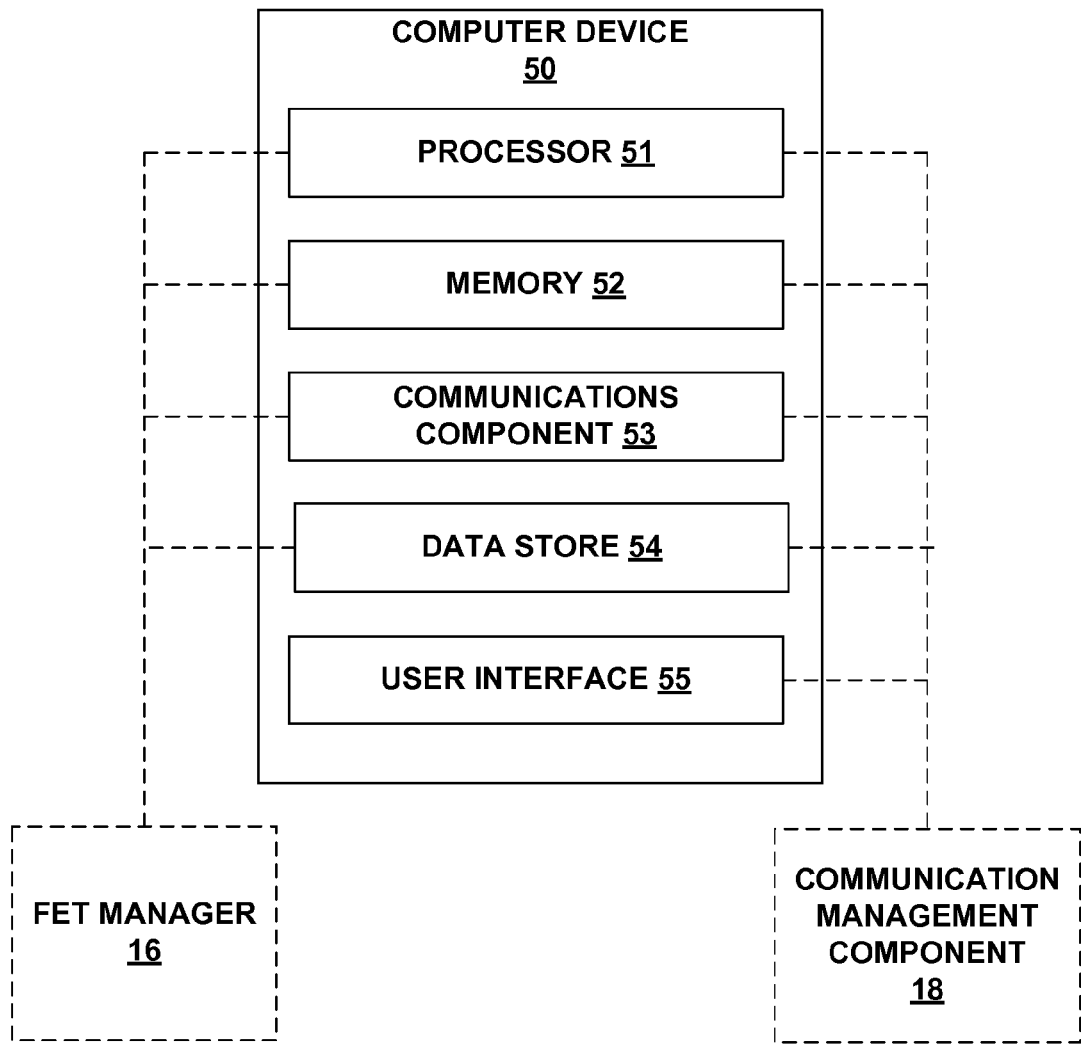
FIG. 8 is a block diagram of an example computer generic device according to aspects of the present disclosure.

Referring to FIG. 8, in one aspect, computer device 50 may include a specially programmed or configured computer device. Computer device 50 includes a processor 60 for carrying out processing functions associated with one or more of components and functions described herein. Processor 60 can include a single or multiple set of processors or multi-core processors. Moreover, processor 60 can be implemented as an integrated processing system and/or a distributed processing system. Additionally, processor 60 may be configured to perform the functions described herein related to improved throughput in DSDS devices. It should be understood that computer device 50 may be the same or similar as a UE (e.g., UE 10, FIG. 1) and/or a network entity (e.g., network entity 12) including one or more components and/or subcomponent described herein.

Computer device 50 further includes a memory 52, such as for storing data used herein and/or local versions of applications being executed by processor 50. Memory 52 can include any type of memory usable by a computer, such as random access memory (RAM), read only memory (ROM), tapes, magnetic discs, optical discs, volatile memory, non-volatile memory, and any combination thereof. Additionally, memory 52 may be configured to store data and/or code or computer-readable instructions for performing the functions described herein related to improved throughput in DSDS devices.

Further, computer device 50 includes a communications component 53 that provides for establishing and maintaining communications with one or more entities utilizing one or more of hardware, software, and services as described herein. Communications component 53 may carry communication signals between components on computer device 50, as well as exchanging communication signals between computer device 50 and external devices, such as devices located across a wired or wireless communications network and/or devices serially or locally connected to computer device 50. For example, communications component 53 may include one or more buses, and may further include transmit chain components and receive chain components associated with a transmitter and receiver, respectively, or a transceiver, operable for interfacing with external devices.

Additionally, computer device 50 may further include a data store 54, which can be any suitable combination of hardware and/or software, that provides for mass storage of information, databases, and programs employed in connection with aspects described herein. For example, data store 54 may be a data repository for applications and data not currently being executed by processor 50, such as those related to the aspect described herein.

Computer device 50 may additionally include a user interface component 55 operable to receive inputs from a user of computer device 50, and further operable to generate outputs for presentation to the user. User interface component 55 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 58 may include one or more output devices, including but not limited to a display, a speaker, a haptic feedback mechanism, a printer, any other mechanism capable of presenting an output to a user, or any combination thereof.

Additionally, in a UE (and/or network entity) implementation, computer device 50 may include FET manager 16, such as in specially programmed computer readable instructions or code, firmware, hardware, one or more processor modules, or some combination thereof. Alternatively or additionally, in a network entity implementation, computer device 50 may include communication management component 18, such as in specially programmed computer readable instructions or code, firmware, hardware, one or more processor modules, or some combination thereof.

Figure 9:
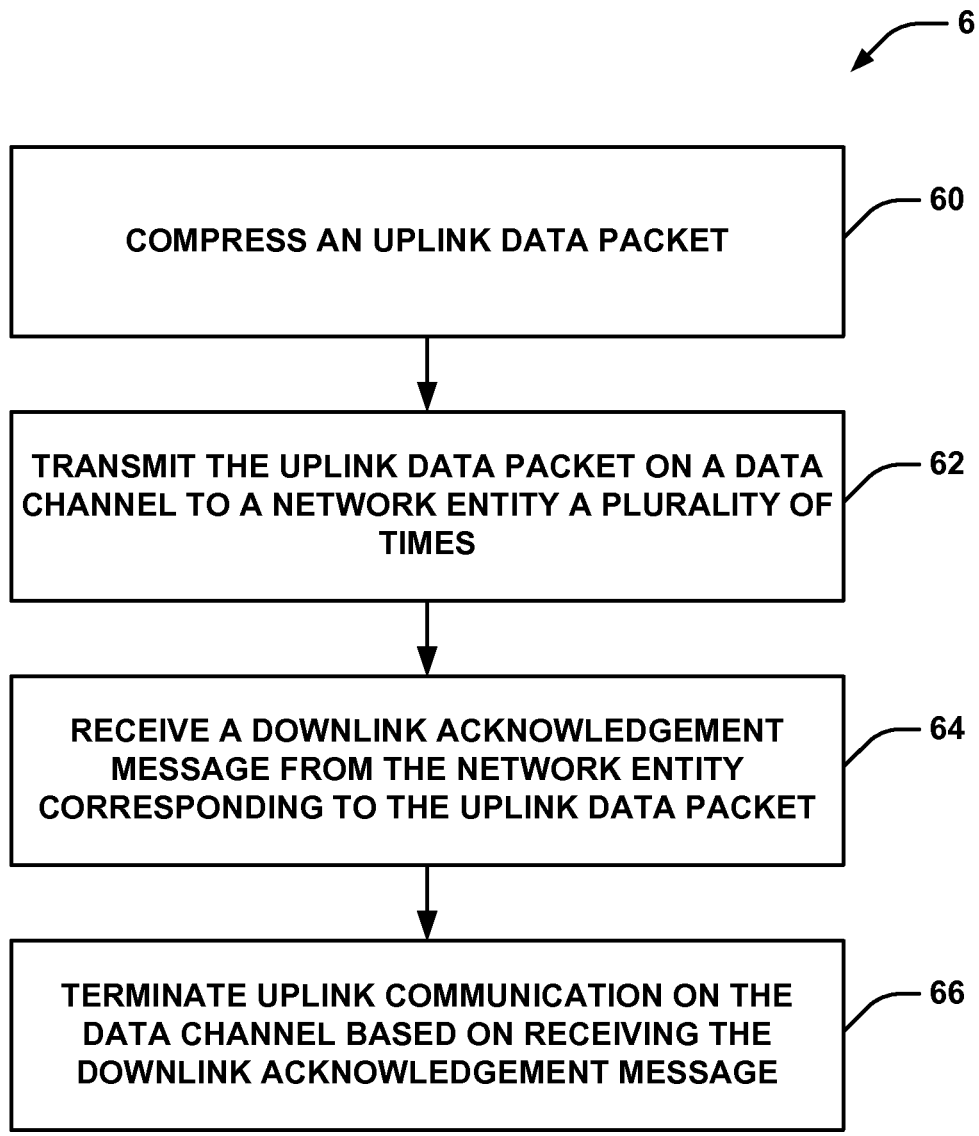
FIG. 9 illustrates an example methodology for FET in a UE according to aspects of the present disclosure.

FIG. 9 illustrates an example methodology 6 for carrying out FET in, for example, a UE. In an aspect, at block 60, a UE may compress an uplink data packet—for a non-limiting example, by reducing a TTI by a factor of n and optionally copying the compressed data packet a plurality of times (e.g. n times). For example, as described herein, FET manager 16 may execute uplink data compression manager 20 (FIG. 2) to compress an uplink data packet 31.

Furthermore, at block 62, the UE may transmit the uplink data packet on a data channel to a network entity a plurality of times (e.g. up to n times). For instance, as described herein, communication manager 21 may execute transmitter 22 (FIG. 2) to transmit the uplink data packet 31 on a data channel (e.g., DPDCH) to a network entity (e.g., network entity 12) a plurality of time (e.g., $n_{repetition}$ 33).

In addition, at block 64, the UE may receive a downlink acknowledgement message from the network entity corresponding to the previously-transmitted uplink data packet. For example, as described herein, communication manager 21 may execute receiver 26 (FIG. 2) to receive a downlink acknowledgement message (e.g., downlink data packet 34) from a network entity 12 corresponding to the previously-transmitted uplink data packet 31.

Furthermore, the UE may terminate, at block 66, an uplink communication on the data channel (e.g. DPDCH) based on receiving the downlink acknowledgement message. For instance, as described herein, FET manager 16 may execute communication manager 21 (FIG. 2) to terminate an uplink communication on the data channel based on receiving the downlink acknowledgment message.

In additional optional aspects of methodology 6, the UE may establish a new uplink channel (e.g. FET-DPCCH), receive a downlink data packet on the data channel, decode the downlink data packet successfully, transmit an uplink acknowledgement message corresponding to the downlink data packet to the network entity (for example, on the new uplink channel and based on receiving the downlink data packet and decoding the downlink data packet successfully), and/or terminate uplink communication on a control channel (e.g. DPCCH) based on transmitting the uplink acknowledgement message.

Further optional, alternative, or additional aspects of methodology 6 may include powering a transmitter down based on receiving the downlink acknowledgement message and decoding the downlink data packet successfully, receiving an uplink power control message that includes at least one bit commanding the user equipment to adjust its transmission power determined by the network entity based on at least an SIR target value, and/or adjusting an uplink transmission power corresponding to the data channel based on the uplink power control message.

Figure 10:
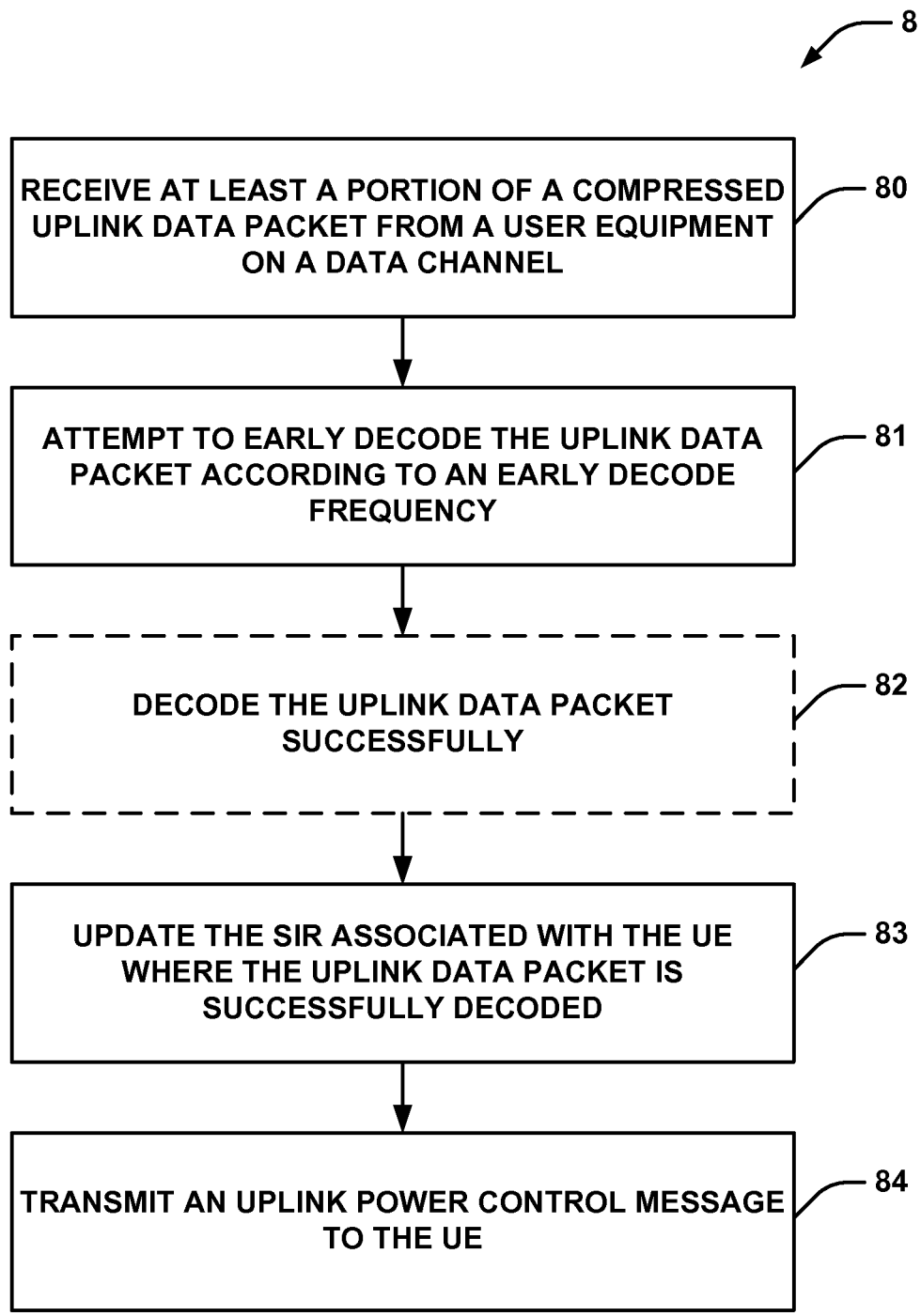
FIG. 10 illustrates an example methodology for wireless communication and power control in a network entity according to aspects of the present disclosure.

FIG. 10 illustrates a flow diagram of an example methodology 8 for wireless communication at a network entity according to the present disclosure. In an aspect, at block 80, the network entity may receive at least a portion of an uplink data packet from a user equipment on a data channel. Furthermore, the received data packet may be compressed. For example, as described herein, communication manager 41 may execute receiver 46 (FIG. 6) to receive at least a portion of an uplink data packet 31 from a UE (e.g., UE 10) on a data channel.

Additionally, at block 81, the network entity may attempt to early decode the uplink data packet according to an early decode frequency, which may optionally lead to the network entity or another entity or component in communication with the network entity decoding the uplink data packet successfully at block 82. For instance, as described herein, communication management component 18 (FIG. 6) may execute uplink data decoder 40 to attempt to early decode the uplink data packet 31 according to an early decode frequency.

Additionally, at block 83, the network entity may update a signal-to-interference ratio (SIR) target value associated with the user equipment where the uplink data packet has been successfully decoded. For example, as described herein, communication manager 41 may execute UE transmission power controller 43 (FIG. 6) to update an SIR target value 44 associated with the UE 10 where the uplink data packet 31 has been successfully decoded (e.g., by uplink data decoder 40).

Moreover, at block 84, the network entity may subsequently transmit an uplink power control message to the user equipment, wherein the contents of the uplink power control message is based at least on the signal-to-interference ratio target value and the SIR target value is associated with the target BLER. In an aspect at least one of the target BLER and/or a particular decoding attempt at which the BLER is targeted may be based on at least one of uplink load measured at the network entity and user equipment power headroom. For instance, as described herein, communication manager 41 may execute transmitter 42 (FIG. 6) to transmit an uplink power control message to the UE 10, wherein the contents of the uplink power control message is based at least on the SIR target value 44 and the SIR target value 44 is associated with the target BLER 45.

Figure 11:
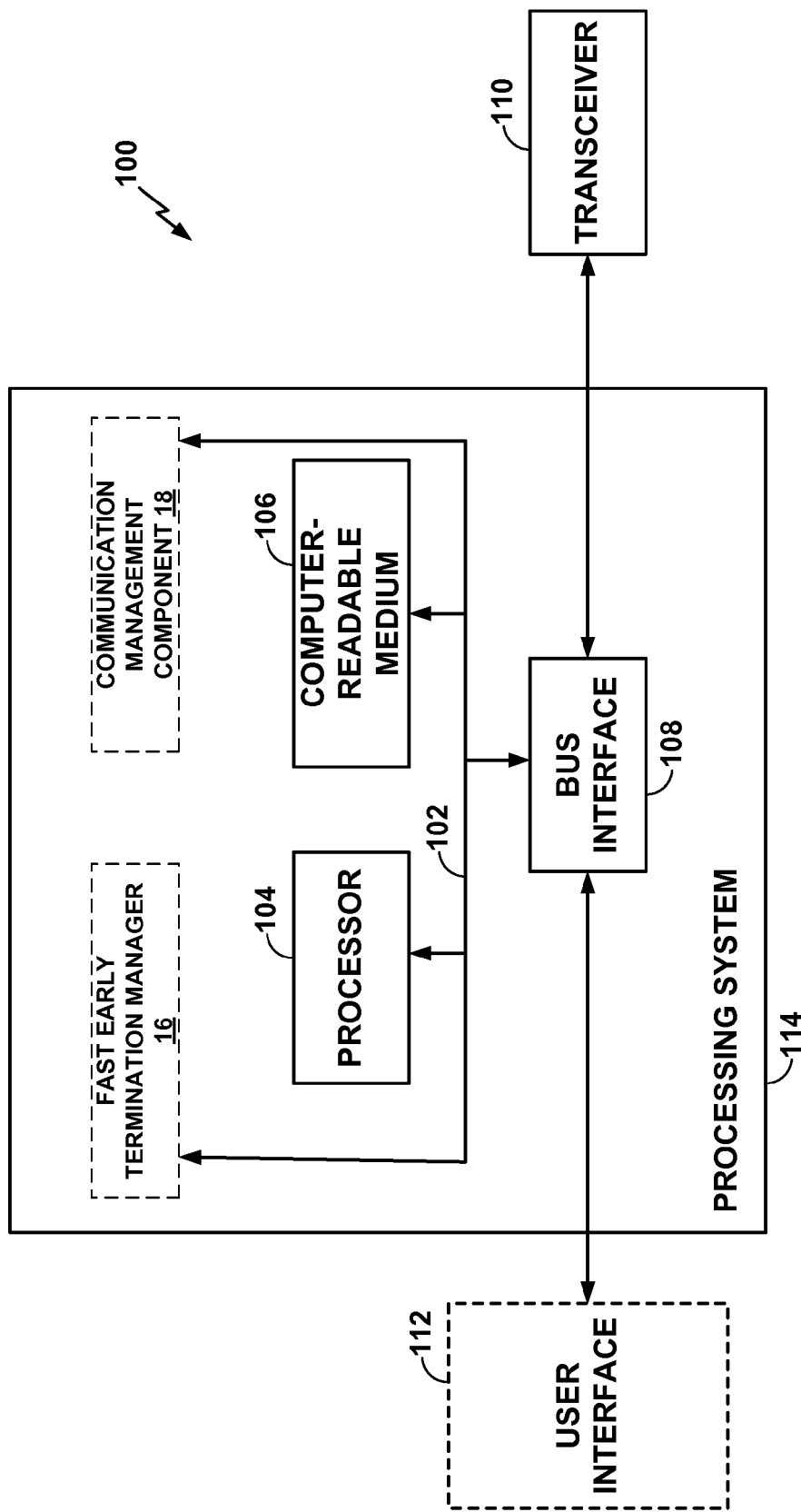
FIG. 11 is a block diagram illustrating an example of a hardware implementation for an apparatus employing a processing system including aspects of the present disclosure described herein.

FIG. 11 is a block diagram illustrating an example of a hardware implementation for an apparatus 100 employing a processing system 114. In some aspects, apparatus may include one or both of the FET manager 16 (FIGS. 1 and 2) and communication manager component 18 (FIGS. 1 and 6). For example, in an aspect of the processing 114 implemented as or in a UE (e.g., UE 10), the processing system 114 may include only fast early termination manager 16. In other aspects of the processing system 114 implemented as or in a network entity (e.g., network entity 12), the processing system 114 may include only communication manager component 18. Further, fast early termination manager 16 and/or communication manager 18 may be implemented by a processor (e.g., processor 104 and/or processing system 114). Moreover, in these examples, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 12:
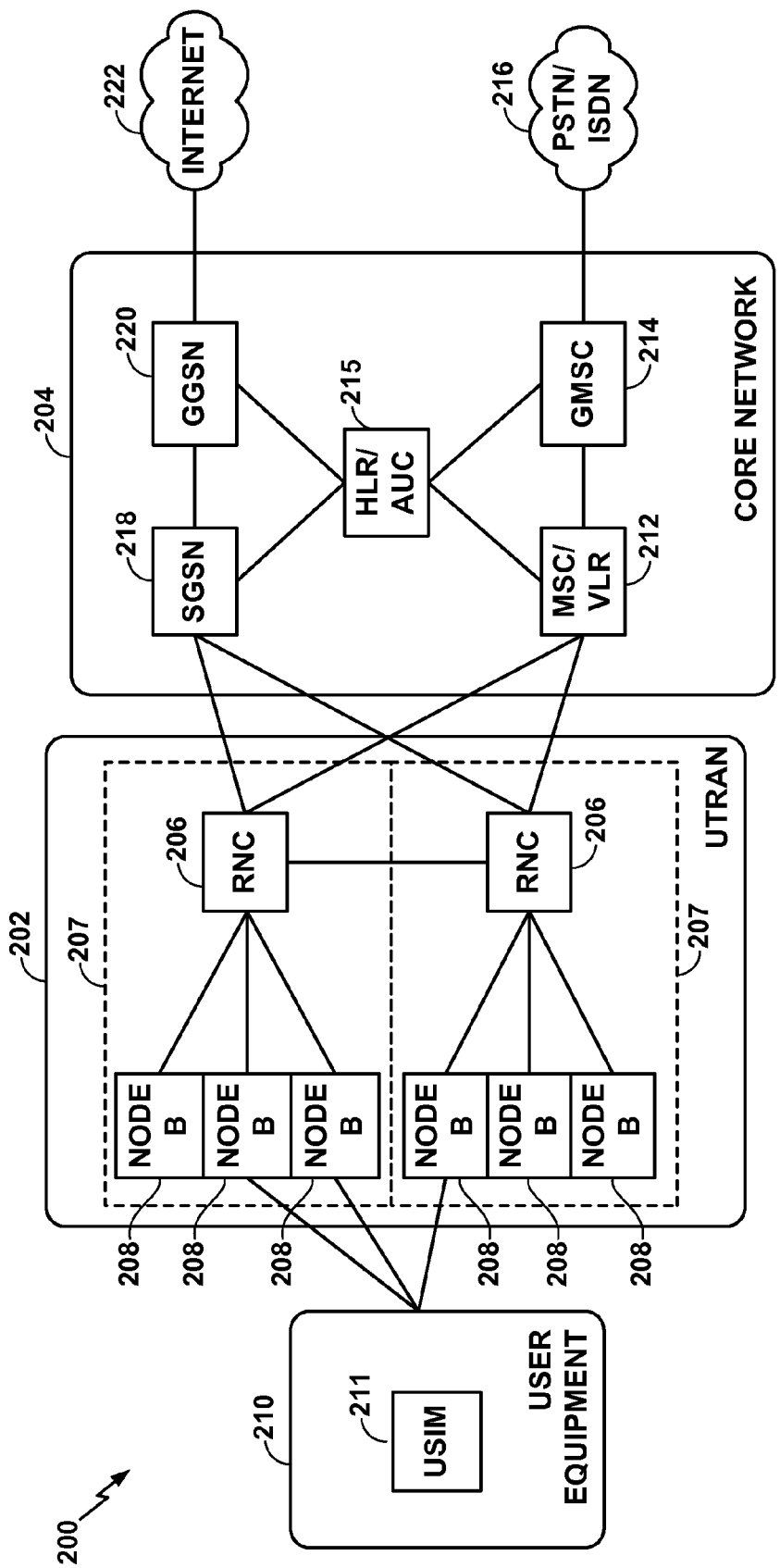
FIG. 12 is a block diagram conceptually illustrating an example of a telecommunications system including aspects of the present disclosure described herein.

The various concepts presented throughout this disclosure may be implemented across a broad variety of telecommunication systems, network architectures, and communication standards. By way of example and without limitation, the aspects of the present disclosure illustrated in FIG. 12 are presented with reference to a UMTS system 200 employing a W-CDMA air interface. A UMTS network includes three interacting domains: a Core Network (CN) 204, a UMTS Terrestrial Radio Access Network (UTRAN) 202, which may be the same as or similar to network entity 12 including communication manager component 18 (FIG. 1), and User Equipment (UE) 210, which may be the same as or similar to UE 10 including fast early termination manager 16 (FIG. 1). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs including UE 210. UE 210 may be a mobile apparatus including a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. UE 10 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 13:
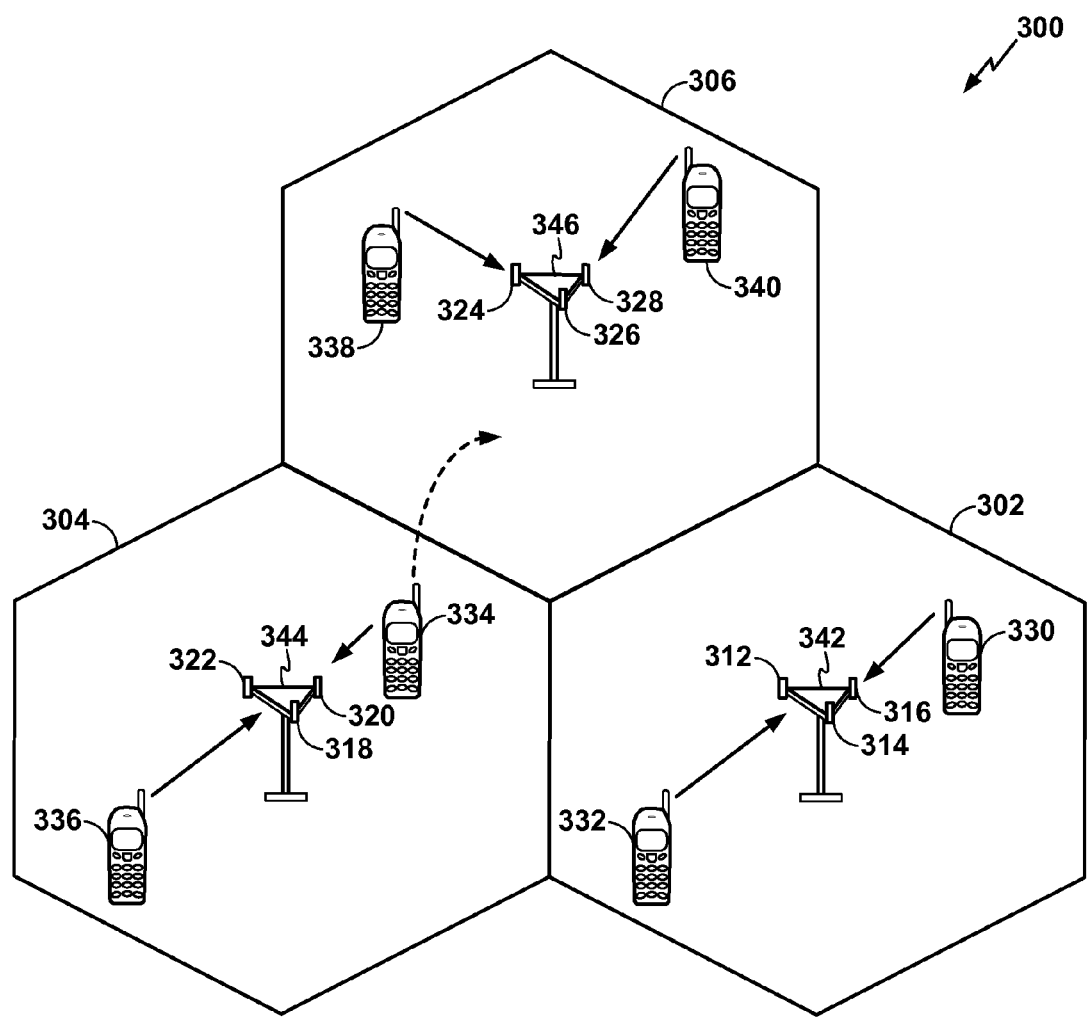
FIG. 13 is a conceptual diagram illustrating an example of an access network including aspects of the present disclosure described herein.

Referring to FIG. 13, an access network 300 in a UTRAN architecture is illustrated. The multiple access wireless communication system includes multiple cellular regions (cells), including cells 302, 304, and 306, each of which may include one or more sectors, and each of which may be the same as or similar to network entity 12 including communication manager component 18 (FIG. 1). The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 12) for all the UEs 330, 332, 334, 336, 338, 340 in the respective cells 302, 304, and 306, each of which may be the same as or similar to UE 10 including fast early termination manager 16 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 12), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 4.

Figure 14:
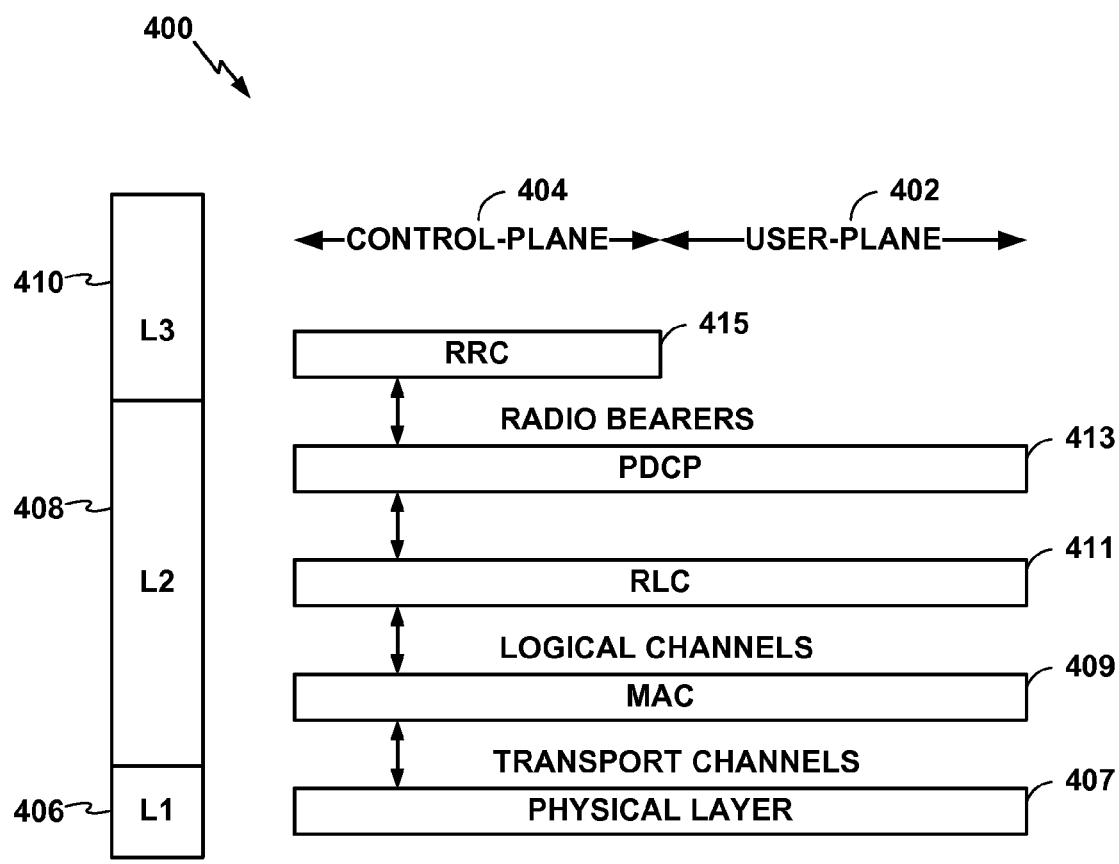
FIG. 14 is a conceptual diagram illustrating an example of a radio protocol architecture for the user and control plane that may be utilized by aspects of the present disclosure described herein.

Referring to FIG. 14 an example radio protocol architecture 400 relates to the user plane 402 and the control plane 404 of a user equipment (UE) or node B/base station. For example, architecture 400 may be included in a UE such as UE 10 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407.

Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 15:
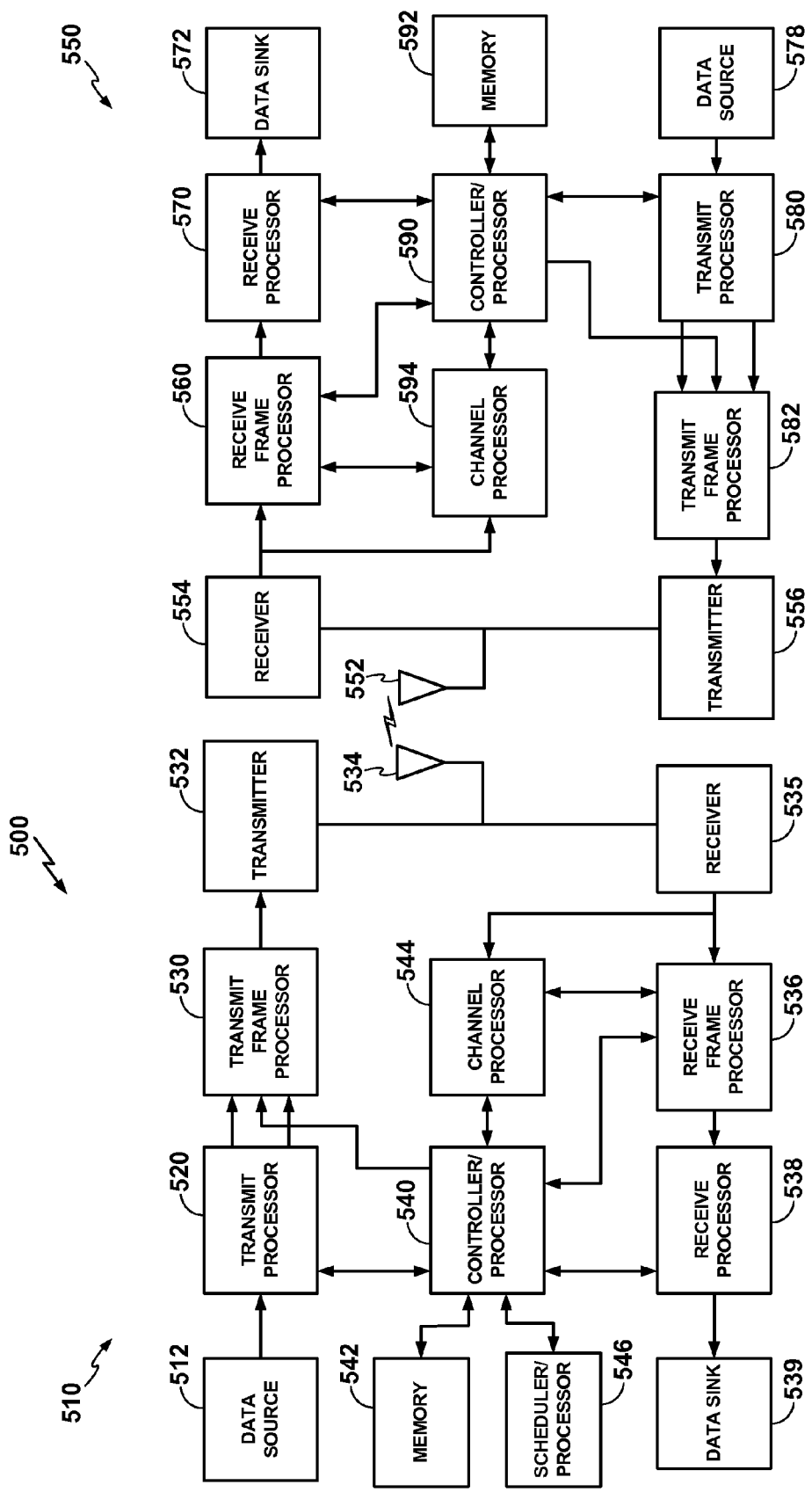
FIG. 15 is a block diagram conceptually illustrating an example of a Node B in communication with a UE in a telecommunications system including aspects of the present disclosure described herein.

FIG. 15 is a block diagram of a Node B 510 in communication with a UE 550, where the Node B 510 may be the Node B 208 in FIG. 12 or the network entity 12 of FIG. 1, and the UE 550 may be the UE 210 in FIG. 12 or UE 10 of FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication at a user equipment, comprising:
   compressing an uplink data packet;
   transmitting the uplink data packet on an uplink dedicated transport channel (DCH) to a network entity a plurality of times within a time duration allowed for transmission of the uncompressed uplink data packet;
   wherein compressing the uplink data packet comprises reducing a transmission time interval (TTI) by a factor of n and the plurality of times comprises n times;
   receiving a downlink acknowledgement message from the network entity corresponding to the uplink data packet; and
   terminating transmission of the uplink DCH by transmitting bits of zero power for a remainder of the time duration on the DCH based on receiving the downlink acknowledgement message.

2. The method of claim 1, further comprising:
receiving, from the network entity, an uplink power control message, wherein the network entity determines contents of the uplink power control message based on at least a signal-to-interference ratio (SIR) target value; and
adjusting an uplink transmission power corresponding to the data channel according to the uplink power control message.

3. The method of claim 2, wherein the SIR target value is based on a target residual block error rate (BLER) associated with a particular decoding attempt.

4. The method of claim 3, wherein at least one of the target residual BLER and the particular decoding attempt at which the target residual BLER is targeted are based on at least one of uplink load measured at the network entity and user equipment power headroom.

5. The method of claim 1, further comprising:
establishing a new uplink channel;
receiving a downlink data packet on the DCH;
decoding the downlink data packet successfully;
transmitting an uplink acknowledgement message corresponding to the downlink data packet to the network entity on the new uplink channel based on receiving the downlink data packet and decoding the downlink data packet successfully; and
terminating uplink communication on a control channel based on transmitting the uplink acknowledgement message.

6. The method of claim 5, further comprising powering down a transmitter based on receiving the downlink acknowledgement message and decoding the downlink data packet successfully.

7. The method of claim 5, wherein the new uplink channel comprises a Transport Format Combination Indicator (TFCI).

8. The method of claim 5, further comprising configuring the control channel with a slot format that does not include TFCI bits.

9. The method of claim 1, wherein the uplink data packet comprises voice data.

10. An apparatus for wireless communication, comprising:
means for compressing an uplink data packet;
means for transmitting the uplink data packet on an uplink dedicated transport channel (DCH) to a network entity a plurality of times within a time duration allowed for transmission of the uncompressed uplink data packet;
wherein the means for compressing the uplink data packet is configured to reduce a transmission time interval (TTI) by a factor of n and wherein the plurality of times comprises n times;
means for receiving a downlink acknowledgement message from the network entity corresponding to the uplink data packet; and
means for terminating transmission of the uplink DCH by transmitting bits of zero power for a remainder of the time duration on the DCH based on receiving the downlink acknowledgement message.

11. The apparatus of claim 10, further comprising:
means for receiving, from the network entity, an uplink power control message, wherein the network entity determines contents of the uplink power control message based on at least a signal-to-interference ratio (SIR) target value; and
means for adjusting an uplink transmission power corresponding to the data channel according to the uplink power control message.

12. The apparatus of claim 10, further comprising:
means for establishing a new uplink channel;
means for receiving a downlink data packet on the DCH;
means for decoding the downlink data packet successfully;
means for transmitting an uplink acknowledgement message corresponding to the downlink data packet to the network entity on the new uplink channel based on receiving the downlink data packet and decoding the downlink data packet successfully; and
means for terminating uplink communication on a control channel based on transmitting the uplink acknowledgement message.

13. A computer program product, comprising:
a computer-readable medium comprising code for:
compressing an uplink data packet;
transmitting the uplink data packet on an uplink dedicated transport channel (DCH) to a network entity a plurality of times within a time duration allowed for transmission of the uncompressed uplink data packet;
wherein compressing the uplink data packet comprises reducing a transmission time interval (TTI) by a factor of n and wherein the plurality of times comprises n times;
receiving a downlink acknowledgement message from the network entity corresponding to the uplink data packet; and
terminating transmission of the uplink DCH by transmitting bits of zero power for a remainder of the time duration on the DCH based on receiving the downlink acknowledgement message.

14. The computer program product of claim 13, wherein the computer-readable medium further comprises code for:
receiving, from the network entity, an uplink power control message, wherein the network entity determines contents of the uplink power control message based on at least a signal-to-interference ratio (SIR) target value; and
adjusting an uplink transmission power corresponding to the data channel according to the uplink power control message.

15. The computer program product of claim 13, wherein the computer-readable medium further comprises code for:
establishing a new uplink channel;
receiving a downlink data packet on the DCH;
decoding the downlink data packet successfully;
transmitting an uplink acknowledgement message corresponding to the downlink data packet to the network entity on the new uplink channel based on receiving the downlink data packet and decoding the downlink data packet successfully; and
terminating uplink communication on a control channel based on transmitting the uplink acknowledgement message.

16. An apparatus for wireless communication, comprising:
at least one processor; and
a memory coupled to the at least one processor, wherein the at least one processor is configured to:
compress an uplink data packet;
transmit the uplink data packet on an uplink dedicated transport channel (DCH) to a network entity a plurality of times within a time duration allowed for transmission of the uncompressed uplink data packet;
wherein to compress the uplink data packet comprises to reduce a transmission time interval (TTI) by a factor of n and wherein the plurality of times comprises n times;

receive a downlink acknowledgement message from the network entity corresponding to the uplink data packet; and terminate transmission of the uplink DCH by transmitting bits of zero power for a remainder of the time duration on the DCH based on receiving the downlink acknowledgement message.

17. The apparatus of claim 16, wherein the at least one processor is further configured to:

receive, from the network entity, an uplink power control message, wherein the network entity determines contents of the uplink power control message based on at least a signal-to-interference ratio (SIR) target value; and adjust an uplink transmission power corresponding to the data channel according to the uplink power control message.

18. The apparatus of claim 17, wherein the SIR target value is based on a target residual block error rate (BLER) associated with a particular decoding attempt.

19. The apparatus of claim 18, wherein at least one of the target residual BLER and the particular decoding attempt at which the target residual BLER is targeted are based on at least one of uplink load measured at the network entity and user equipment power headroom.

20. The apparatus of claim 16, wherein the at least one processor is further configured to:

establish a new uplink channel;
receive a downlink data packet on the DCH;
decode the downlink data packet successfully;
transmit an uplink acknowledgement message corresponding to the downlink data packet to the network entity on the new uplink channel based on receiving the downlink data packet and decoding the downlink data packet successfully; and
terminate uplink communication on a control channel based on transmitting the uplink acknowledgement message.

21. The apparatus of claim 20, wherein the at least one processor is further configured to power down a transmitter based on receiving the downlink acknowledgement message and decoding the downlink data packet successfully.

22. The apparatus of claim 20, wherein the new uplink channel comprises a Transport Format Combination Indicator (TFCI).

23. The apparatus of claim 20, wherein the at least one processor is further configured to configure the control channel with slot format that does not include TFCI bits.

24. The apparatus of claim 16, wherein the uplink data packet comprises voice data.

25. A method of wireless communication at a network entity, comprising:

receiving at least a portion of an uplink data packet from a user equipment (UE) on an uplink dedicated transport channel (DCH), wherein the uplink data packet is compressed wherein the compressed uplink data packet comprises at least a transmission time interval (TTI) that is reduced by a factor of n;
attempting to early decode the uplink data packet at a set of early decode times;
updating a signal-to-interference ratio (SIR) target value associated with the UE where the uplink data packet is successfully decoded at a particular decoding attempt; and
transmitting an uplink power control message to the UE, wherein contents of the uplink power control message is based at least on the SIR target value and the SIR target value is associated with a target residual block error rate (BLER).

26. The method of claim 25, wherein at least one of the target residual BLER and a particular decoding attempt at which the target residual BLER is targeted are based on at least one of uplink load measured at the network entity and user equipment power headroom.

27. The method of claim 25, further comprising:
transmitting a downlink data packet on the DCH; and
receiving an uplink acknowledgement message corresponding to the downlink data packet on a new uplink data channel based on transmitting the downlink data packet.

28. The method of claim 27, wherein the new uplink data channel comprises a Transport Format Combination Indicator (TFCI).

29. The method of claim 25, wherein the uplink data packet comprises voice data.

30. An apparatus for wireless communication, comprising:
means for receiving at least a portion of an uplink data packet from a user equipment (UE) on an uplink dedicated transport channel (DCH), wherein the uplink data packet is compressed, wherein the compressed uplink data packet comprises at least a transmission time interval (TTI) that is reduced by a factor of n;
means for attempting to early decode the uplink data packet at a set of early decode times;
means for updating a signal-to-interference ratio (SIR) target value associated with the UE where the uplink data packet is successfully decoded at a particular decoding attempt; and
means for transmitting an uplink power control message to the UE, wherein contents of the uplink power control message is based at least on the SIR target value and the SIR target value is associated with a target residual block error rate (BLER).

31. The apparatus of claim 30, wherein at least one of the target residual BLER and a particular decoding attempt at which the target residual BLER is targeted are based on at least one of uplink load measured at a network entity and user equipment power headroom.

32. A computer program product, comprising:
a computer-readable medium comprising code for:
receiving at least a portion of an uplink data packet from a user equipment (UE) on an uplink dedicated transport channel (DCH), wherein the uplink data packet is compressed, wherein the compressed uplink data packet comprises at least a transmission time interval (TTI) that is reduced by a factor of n;
attempting to early decode the uplink data packet at a set of early decode times;
updating a signal-to-interference ratio (SIR) target value associated with the UE where the uplink data packet is successfully decoded at a particular decoding attempt; and
transmitting an uplink power control message to the UE, wherein contents of the uplink power control message is based at least on the SIR target value and the SIR target value is associated with a target residual block error rate (BLER).

33. The computer program product of claim 32, wherein at least one of the target residual BLER and a particular decoding attempt at which the target residual BLER is targeted are based on at least one of uplink load measured at a network entity and user equipment power headroom.

34. An apparatus for wireless communication, comprising:
    at least one processor; and
    a memory coupled to the at least one processor, wherein the at least one processor is configured to:
        receive at least a portion of an uplink data packet from a user equipment (UE) on an uplink dedicated transport channel (DCH), wherein the uplink data packet is compressed, wherein the compressed uplink data packet comprises at least a transmission time interval (TTI) that is reduced by a factor of n;
        attempt to early decode the uplink data packet at a set of early decode times;
        update a signal-to-interference ratio (SIR) target value associated with the UE where the uplink data packet is successfully decoded at a particular decoding attempt; and
        transmit an uplink power control message to the UE, wherein contents of the uplink power control message is based at least on the SIR target value and the SIR target value is associated with a target residual block error rate (BLER).

35. The apparatus of claim 34, wherein at least one of the target residual BLER and a particular decoding attempt at which the target residual BLER is targeted are based on at least one of uplink load measured at a network entity and user equipment power headroom.

36. The apparatus of claim 34, wherein the at least one processor is further configured to:
    transmit a downlink data packet on the DCH; and
    receive an uplink acknowledgement message corresponding to the downlink data packet on a new uplink data channel based on transmitting the downlink data packet.

37. The apparatus of claim 36, wherein the new uplink data channel comprises a Transport Format Combination Indicator (TFCI).

38. The apparatus of claim 34, wherein the uplink data packet comprises voice data.

* * * * *